United States Patent [19]

Davis

[11] Patent Number: 4,473,359
[45] Date of Patent: Sep. 25, 1984

[54] FLEXIBLE COUPLING DEVICE

[76] Inventor: Robert R. Davis, 247A Brook La., Grafton, Va. 23692

[21] Appl. No.: 304,641

[22] Filed: Sep. 22, 1981

[51] Int. Cl.³ .............................................. F16D 3/72
[52] U.S. Cl. ..................................... 464/88; 464/147
[58] Field of Search ...................... 464/62, 66, 67, 81, 464/87, 92, 88, 147, 155, 156, 158, 159; 192/106.1, 106.2; 403/223, 306, 305, 300

[56] References Cited

U.S. PATENT DOCUMENTS

| 777,215 | 12/1904 | Meston | 403/306 X |
|---|---|---|---|
| 2,360,149 | 10/1944 | Moser | 464/92 |
| 2,867,102 | 1/1959 | Williams | 464/88 |
| 2,867,103 | 1/1959 | Williams | 464/88 |
| 3,280,242 | 10/1966 | Brown | 464/66 X |
| 3,395,552 | 8/1968 | Hauser, Jr. | 464/87 X |
| 3,788,098 | 1/1974 | Miller et al. | 464/88 |
| 4,228,664 | 10/1980 | McCoy | 464/92 |
| 4,312,193 | 1/1982 | Gibbs et al. | 464/88 |
| 4,400,914 | 8/1983 | Hennessy | 464/88 X |

FOREIGN PATENT DOCUMENTS

| 837865 | 9/1961 | France | 464/92 |
|---|---|---|---|
| 479638 | 2/1937 | United Kingdom | 464/87 |

Primary Examiner—Stuart S. Levy
Assistant Examiner—Daniel P. Stodola

[57] ABSTRACT

The device is intended for use in coupling together the ends of two spaced apart shafts. The device consists principally of two opposing coupling hubs interconnected by a flexible coupling member. The coupling hubs are identical. The outer surface of each hub is flat. The interior of each coupling hub shows an internal hub having an opening therethrough to receive the end of one shaft. A set screw is provided in the inner hub to further secure the coupling hub to the shaft. The outer wall of the coupling hub presents a scalloped appearance with the points of the scallops directed inwardly. The outer wall is spaced from the inner hub which has an outer vertical surface of saw-toothed configuration. There is an opening through the outer wall of the coupling hub so that an Allen wrench or like device may be inserted therethrough to turn the set screw. The flexible coupling member interconnecting the two coupling hubs has a smooth cylindrical central section with a flange on each end. The outer vertical surface of the flange is scalloped to match the scalloped inner wall of the coupling hub. The cylindrical central portion of the flexible coupling member is hollow and the interior wall has a saw-toothed configuration which matches the saw-toothed configuration on the inner hub of the coupling hub.

4 Claims, 8 Drawing Figures

FLEXIBLE COUPLING DEVICE

FIELD OF INVENTION

The present invention lies in the field of coupling devices and more particularly in the field of coupling devices for shafts of two mechanical elements which when interconnected provide a minimal clearance between the ends of the respective shafts.

BACKGROUND OF THE INVENTION

Motor pump units for circulation systems such as hot water heating have long used couplings to join the shaft of the motor unit to the pump unit for the transmission of torque to operate the pump. The pump unit is installed in the water line and has a housing which encloses a shaft upon which the pump itself is mounted in the housing. The motor unit in its housing has a shaft extending therefrom. The units are assembled by bolting together the opposing faces of the housings covering the respective extending stub shafts. When so assembled the space between the ends of the respective stub shafts is seldom greater than one-quarter inch. The coupling to join the two stub shafts for transmission of the motor to the pump must have a certain flexibility in it to protect the motor, and stops noise from transmitting through the piping in the system. The most important part of the coupling is the overall size that will fit into these small pump assemblies. The space between pump housing and motor housing is very critical.

A type of flexible coupling used for circulating pump units is disclosed in U.S. Pat. No. 3,280,242. Between 75 and 85 percent of circulating pump units used in hot water heating systems employ this coupling disclosed in this patent. Assembly of a motor pump unit employing the disclosed coupling is time consuming and requires a considerable amount of dexterity. In practice one of the hubs of the coupling is secured to one shaft, for example that of the pump. The motor unit is held in one hand at the approximate level of the pump unit and the other hub is then slid onto the motor shaft. The coupling must then be turned about the motor shaft unit so that the arms on that hub cause the flexible springs to at least be spread out. Then while holding the hub in this position with one hand, the same hand must attempt to tighten the set screw in the hub on the motor shaft to lock the hub in that position. After this has been accomplished, the two units may be bolted or otherwise secured together depending upon the design of the unit. Should one of the spring elements in this type of coupling break or pull out of its arm, then the entire unit must be disassembled and the coupling removed from both shafts. A replacement of the coupling follows the procedure outlined previously.

SUMMARY OF THE PRESENT INVENTION

The device is intended for use in coupling together the ends of two spaced apart shafts. The device consists principally of two opposing coupling hubs interconnected by a flexible coupling member. The coupling hubs are identical. The outer surface of each hub is flat. The interior of each coupling hub shows an internal hub having an opening therethrough to receive the end of one shaft and set screw is provided in the inner hub to further secure the coupling hub to the shaft. The outer wall of the coupling hub presents a scalloped appearance with the points of the scallops directed inwardly. The outer wall is spaced from the inner hub which has an outer vertical surface of saw-toothed configuration. There is an opening through the outer wall of the coupling hub so that an allen wrench or like device may be inserted therethrough to turn the set screw. The flexible coupling member interconnecting the two coupling hubs has a smooth cylindrical central section with a flange on each end. The outer vertical surface of the flange is scalloped to match the scalloped inner wall of the coupling hub. The cylindrical central portion of the flexible coupling member is hollow and the interior wall has a saw-toothed configuration which matches the saw-toothed configuration on the inner hub of the coupling hub.

The present invention may be quickly and easily installed on each of the stub shafts of the motor and pump. Should the coupling break because of excess torque and pull thereon, it is only necessary to replace the flexible coupling member without disassembly of the coupling hubs from their respective shafts.

BRIEF DESCRIPTION OF THE DRAWINGS

A nonlimiting, illustrative embodiment of the present invention will be seen in the drawings.

DETAILED DESCRIPTION OF THE INVENTION

Figure 1:
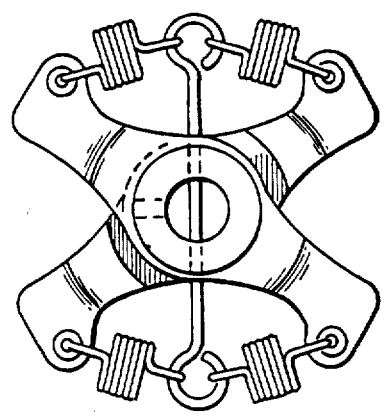
FIG. 1 is a plan view of a flexible coupling according to the previous disclosure, the bottom plan being substantially identical.
Figure 2:
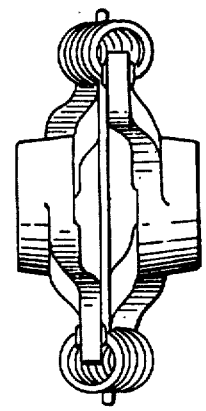
FIG. 2 is a right end elevation view of the flexible coupling in FIG. 1, the left elevation view being substantially identical.

FIGS. 1 and 2 disclose the flexible coupling which is the subject of U.S. Pat. No. 3,280,242 and the assembly of a motor pump in it using this coupling as being described above in Background of the Invention. It can be recognized that when the coupling is in its unattached form it will have a somewhat "floppy" appearance since there is no stabilizing element present to maintain the coupling in the position seen in FIG. 1. It will also be recognized that to position the flexible coupling as shown in FIG. 1 on two separate shafts requires considerable dexterity and obviously will take some time, even occasionally requiring the presence of two persons to perform the task more quickly.

Figure 3:
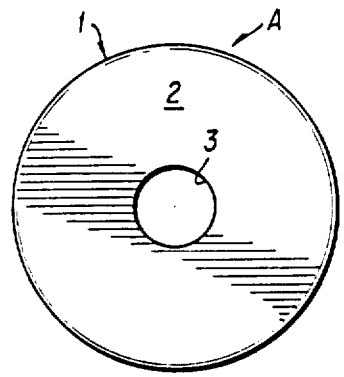
FIG. 3 is a top plan view of the present invention, the bottom plan view being substantially identical.
Figure 4:
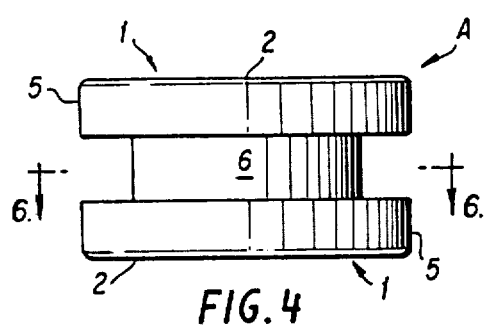
FIG. 4 is a front elevation view of the invention seen in FIG. 3, elevation views from any other direction being substantially identical.

Referring now to FIG. 3 and FIG. 4, it will be seen that the flexible coupling device of the present invention is of general cylindrical configuration. It consists of two identical cylindrical coupling hubs (1) interconnected by a coupling member (6) which is of a flexible material, natural or synthetic. Each coupling hub (1) has a flat outer surface (2) and a short vertical wall (5). An opening (3) is formed in the outer surface (2) of each coupling hub (1) to receive the end of one of the shafts of the motor pump unit to which the coupling is to be attached. There are in each of the said shafts, pump, and motor a countersunk hole to attach hub to shaft. By means of tighting set screw from hub into countersunk holes on shafts.

Figure 5:
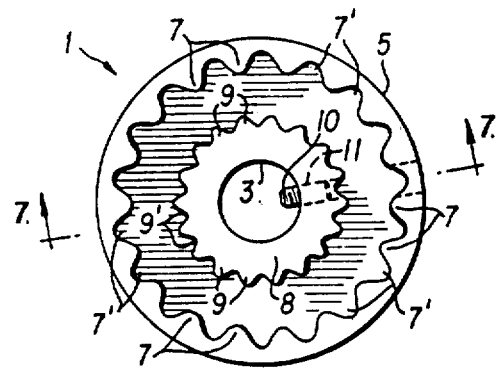
FIG. 5 is a plan view of the interior of a coupling hub of the present invention.
Figure 7:
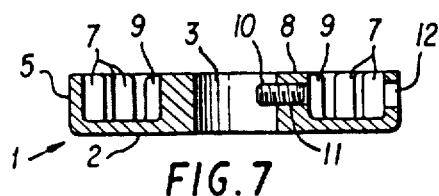
FIG. 7 is an elevational view and cross-section along the plain 7—7 in FIG. 5.

FIG. 5 shows the inner side of each coupling member (1). The inner wall of each coupling member (1) has a scalloped configuration consisting of crests (7) and valleys (7'). The crests and the valleys are of arcuate form. In the center of the inner side of each coupling hub (1) there is an inner hub (8) through which passes the opening (3) for a shaft. (3) (4). The outer vertical surface of the inner hub (8) is of saw-toothed configuration. The crests (9) and valleys (9') are of angular configuration. Referring also to FIG. 7 in conjunction with FIG. 5, it will be seen that a threaded opening (11) passes through the inner hub (8) to receive a set screw (10). An opening (12) in the outer wall of each coupling hub (1) provides access to the set screw (10).

Figure 6:
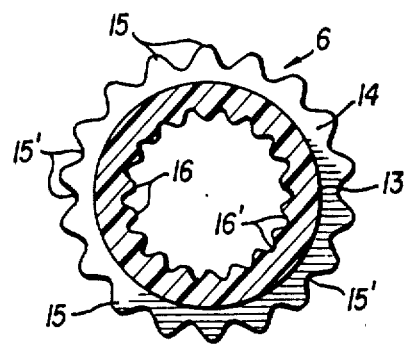
FIG. 6 is a cross-sectional plan view on the plain 6—6 in FIG. 4.
Figure 8:
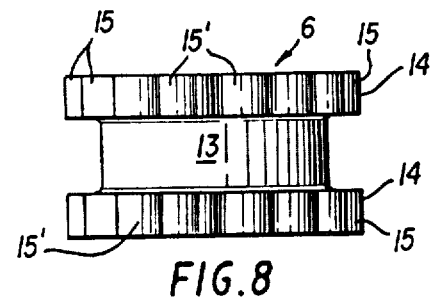
FIG. 8 is a front elevation view of the flexible coupling member of the present invention, elevation views from all directions being substantially identical.

Referring now to FIG. 6 and FIG. 8, there is shown the flexible coupling member (6) which is made of a flexible material such as natural or synthetic rubber or any other material which can withstand a certain amount of sheer force without rupturing. The flexible coupling (6) consists of a central cylindrical portion (13) with flange portions (14) extending from each end. Each flange portion has an outer vertical surface which is scalloped, having crests (15) and valleys (15'), the crests and valleys being of arcuate form. The scalloped surface of the flange (14) matches the scalloped surface on the inner side of the vertical wall (5) of the coupling hub (1). The central portion (13) of the flexible coupling (6) is shown as having a cylindrical outer surface. The central portion (13) may selectively be of the same diameter as the flange portions (14) and would have a surface configuration identical to that of the flange portions (15). The diameter of the central portion (13) may be between that shown in FIG. 8 and the diameter of flange (14) need not necessarily have the scalloped configuration of the flanges (14). The interior of the flexible coupling (6) is hollow. The interior wall has a saw-toothed configuration of crests (16) and valleys (16') which match the respective valleys (19) and crests (9) of the inner disk (8) of the coupling hub (1). It is within the scope of the present invention that the outer portions of the interior wall of flexible couplings (6) have a saw-toothed configuration to the extent that it would be of sufficient depth to firmly encompass the saw-toothed surface of inner disk (8) of coupling hub (1).

Installation of the flexible coupling device of the present invention is easily accomplished and quickly done. One of the coupling hubs (1) is secured to the shaft of the pump unit. The other coupling hub (1) is assembled to the shaft of the motor unit. The flexible coupling member (6) may be inserted into either coupling member and then rotated as necessary so that the housings of each of the respective units may be aligned and then pushed toward the pump unit so that the coupling hub on the motor unit engages the respective flange (14) of the flexible coupling (6). As an alternative the flexible coupling (6) may be inserted into the coupling hub (1) on the motor unit and the shaft motor unit turned so that the respective housings for the units are aligned and then the motor unit pushed forward toward the pump unit so that the flexible coupling (6) engages the coupling hub on the shaft of the hub. Should the flexible coupling (6) rupture as a result of extreme torque placed upon it, replacement is very simple and quickly done. The respective housings of the two units are uncoupled and separated. The ruptured flexible coupling member (6) is removed and a new one inserted and the housings are then again assembled.

The advantages of the IMPROVED FLEXIBLE COUPLING DEVICE of the present invention are readily apparent to those working in the field of constructing or maintaining hot water circulating systems. The invention is particularly useful in any other field wherein it is necessary to couple a driving and a driven unit together and particularly where spacing between the ends of the shafts is very minimal. Thus the scope of the present invention may be expanded into other areas of endeavor and is limited only by the claims.

What is claimed is:

1. An improved flexible coupling device for transfer of torque from a driving unit stub shaft to a driven unit stub shaft with a minimal distance between the ends of said shafts comprising: a pair of spaced apart cylindrical coupling hubs, each coupling hub comprising a flat, circular end plate positioned about the longitudinal axis having first and second faces, an outer wall extending axially from the outer periphery of said second face and having a scalloped configuration of rounded crests and valleys on the inner peripheral surface thereof, an inner hub extending axially from the center of said second face and having a saw-toothed configuration on the outer periphery thereof, said outer wall and said inner hub defining an annular space therebetween, a central opening extending through said end plate and said inner hub to receive a respective one of said driving and driven stub shafts, and set screw means passing through said inner hub and connecting with said central opening to secure each said coupling hub on its respective shaft; a hollow flexible elongated coupling member interconnecting said coupling hubs and spaced from said shafts, said coupling member having means on each end thereof to frictionally engage said inner peripheral surface of said outer wall and said outer periphery of said inner hub of each coupling hub in interlocking relationship to transfer torque from one coupling hub to the other coupling hub; and a radially extending opening through said outer wall in alignment with said set screw means to provide access to said set screw means.

2. The device according to claim 1 wherein said coupling member comprises a cylinder of resilient material having a predetermined torque resistance to rupture, the inner diameter of said cylinder being greater than the outer diameters of said shafts, said frictional engaging means of said coupling member comprising at least a portion of its outer peripheral surface having a scalloped configuration of rounded crests and valleys to frictionally engage said inner peripheral surface of said outer wall.

3. The device according to claim 2 wherein said frictional engaging means of said coupling member further comprises at least a portion of its inner peripheral surface having a saw-toothed configuration to frictionally engage said outer periphery of said inner hub.

4. An improved flexible coupling device for use with a motor driven circulating pump comprising a pair of spaced apart cylindrical cap-like coupling hubs with means on the inner side of of each coupling hub to receive a shaft from said motor and a shaft from said pump respectively, said shaft receiving means having means passing therethrough to secure each of said hubs to its respective shaft, each coupling hub having an inner wall having a scalloped configuration, said coupling hub inner wall being outwardly spaced from said shaft receiving means which has an outer wall of saw-toothed configuration, said coupling hubs being interconnected for transmission of torque by a cylindrical flexible coupling member having a hollow core of a diameter greater than the outside diameter of said shafts, said flexible coupling member having a smooth surface central portion with an outwardly extending cylindrical flange at each end thereof, the outer circumferential surface of each said flanges having a scalloped configuration to frictionally engage said scalloped configuration on the inner wall of each of said hubs, the inner wall of said hollow flexible coupling member flange having a saw-toothed configuration to matchingly engage said saw-toothed configuration on the outer wall of said shaft receiving means, said inner wall of each of said hubs having an opening therethrough for access to said shaft securing means in said shaft receiving means.

* * * * *